United States Patent
Kimes et al.

(10) Patent No.: US 10,183,570 B2
(45) Date of Patent: Jan. 22, 2019

(54) DRIVE SYSTEMS INCLUDING TRANSMISSIONS FOR ELECTRIC AND HYBRID ELECTRIC VEHICLES

(71) Applicant: Means Industries, Inc., Saginaw, MI (US)

(72) Inventors: John W. Kimes, Wayne, MI (US); Philip B. Woodley, Chicago, IL (US)

(73) Assignee: Means Industries, Inc., Saginaw, MI (US)

( * ) Notice: Subject to any disclaimer, the term of this patent is extended or adjusted under 35 U.S.C. 154(b) by 72 days.

(21) Appl. No.: 15/653,632

(22) Filed: Jul. 19, 2017

(65) Prior Publication Data

US 2017/0313173 A1 Nov. 2, 2017

Related U.S. Application Data

(63) Continuation-in-part of application No. 14/487,322, filed on Sep. 16, 2014, now Pat. No. 9,874,252, which
(Continued)

(51) Int. Cl.
| | |
|---|---|
| *B60K 6/44* | (2007.10) |
| *B60K 6/445* | (2007.10) |
| *B60K 6/365* | (2007.10) |
| *B60K 6/387* | (2007.10) |
| *B60K 6/547* | (2007.10) |

(Continued)

(52) U.S. Cl.
CPC .............. *B60K 6/445* (2013.01); *B60K 6/365* (2013.01); *B60K 6/383* (2013.01); *B60K 6/387* (2013.01); *B60K 6/405* (2013.01); *B60K 6/547* (2013.01); *B60L 7/20* (2013.01); *B60L 11/123* (2013.01); *F16D 23/02* (2013.01); *F16D 11/14* (2013.01); *F16D 23/0606* (2013.01); *F16D 27/004* (2013.01); *F16D 27/118* (2013.01); *F16H 1/2845* (2013.01); *F16H 3/728* (2013.01); *F16H 37/082* (2013.01); *F16H 2200/2041* (2013.01); *F16H 2200/2043* (2013.01);
(Continued)

(58) Field of Classification Search
None
See application file for complete search history.

(56) References Cited

U.S. PATENT DOCUMENTS

| | | |
|---|---|---|
| 5,847,469 A | 12/1998 | Tabata et al. |
| 5,856,709 A | 1/1999 | Ibaraki et al. |

(Continued)

*Primary Examiner* — Dirk Wright
(74) *Attorney, Agent, or Firm* — Warner Norcross + Judd LLP (57) ABSTRACT

Drive systems or powertrains including transmissions for electric and hybrid electric vehicles are provided. In some embodiments, dynamic, 2-position linear motor, one-way clutches are provided. In other embodiments, 3-position linear motor, 2-way clutches are provided. In a fixed speed ratio operating mode of an electric vehicle powertrain, torque values for two electric motors are determined by control logic to optimize overall efficiency of the motors. In a fixed torque ratio operating mode of the powertrain, speed values for the two motors are determined to optimize overall efficiency. A hybrid electric powertrain of at least one embodiment uses the optimized electric vehicle powertrain, an engine and the one-way and 2-way clutches to obtain a highly optimized hybrid powertrain.

28 Claims, 9 Drawing Sheets

Related U.S. Application Data is a continuation-in-part of application No. 14/037,430, filed on Sep. 26, 2013, now Pat. No. 9,933,049.

(60) Provisional application No. 62/363,880, filed on Jul. 19, 2016.

(51) Int. Cl.

| | | |
|---|---|---|
| *B60K 6/383* | (2007.10) | |
| *B60K 6/405* | (2007.10) | |
| *B60L 11/12* | (2006.01) | |
| *B60L 7/20* | (2006.01) | |
| *F16D 23/02* | (2006.01) | |
| *F16H 3/72* | (2006.01) | |
| *F16H 1/28* | (2006.01) | |
| *F16H 37/08* | (2006.01) | |
| *F16D 11/14* | (2006.01) | |
| *F16D 23/06* | (2006.01) | |
| *F16D 27/00* | (2006.01) | |
| *F16D 27/118* | (2006.01) | |

(52) U.S. Cl.
CPC ............... *F16H 2200/2066* (2013.01); *F16H 2200/2082* (2013.01); *Y10T 74/19251* (2015.01)

(56) References Cited

U.S. PATENT DOCUMENTS

| | | | |
|---|---|---|---|
| 5,934,395 A | 8/1999 | Koide et al. | |
| 6,019,699 A | 2/2000 | Hoshiya et al. | |
| 6,306,057 B1 | 10/2001 | Morisawa et al. | |
| 6,344,008 B1 | 2/2002 | Nagano et al. | |
| 7,090,613 B2 * | 8/2006 | Heap | B60K 6/445 477/3 |
| 7,200,476 B2 * | 4/2007 | Cawthorne | B60K 6/445 180/65.265 |
| 7,201,690 B2 | 4/2007 | Miura et al. | |
| 7,223,200 B2 | 5/2007 | Kojima et al. | |
| 7,237,634 B2 | 7/2007 | Severinsky et al. | |
| 7,255,186 B2 | 8/2007 | Wakuta et al. | |
| 7,282,008 B2 * | 10/2007 | Oshidari | B60K 6/445 477/4 |
| 7,305,873 B2 * | 12/2007 | Hubbard | B60K 6/445 73/114.11 |
| 7,393,296 B2 | 7/2008 | Kano et al. | |
| 7,397,296 B1 | 7/2008 | Kiani | |
| 7,426,971 B2 | 9/2008 | Kano et al. | |
| 7,614,466 B2 | 11/2009 | Kano et al. | |
| 7,621,359 B2 | 11/2009 | Kano et al. | |
| 7,633,247 B2 | 12/2009 | Obayashi | |
| 7,690,455 B2 | 4/2010 | Kano et al. | |
| 7,727,109 B2 * | 6/2010 | Matsubara | B60W 20/40 477/3 |
| 7,942,781 B2 | 5/2011 | Kimes | |
| 8,082,072 B2 * | 12/2011 | Egami | B60K 6/445 701/22 |
| 8,167,754 B2 | 5/2012 | Phillips | |
| 8,209,097 B2 * | 6/2012 | Heap | B60K 6/445 701/54 |
| 8,226,515 B2 | 7/2012 | Phillips | |
| 8,246,501 B2 | 8/2012 | Phillips | |
| 8,251,850 B2 | 8/2012 | Phillips | |
| 8,398,514 B2 | 3/2013 | Phillips | |
| 8,579,760 B2 * | 11/2013 | Imamura | B60W 20/15 477/7 |
| 8,813,929 B2 | 8/2014 | Kimes | |
| 8,888,637 B2 | 11/2014 | Kimes | |
| 8,942,879 B2 * | 1/2015 | Tsuda | B60W 10/115 180/65.265 |
| 9,109,636 B2 | 8/2015 | Kimes et al. | |
| 9,186,977 B2 | 11/2015 | Kimes | |
| 9,303,699 B2 | 4/2016 | Kimes et al. | |
| 9,862,374 B2 * | 1/2018 | Jerwick | F16H 37/065 |
| 10,059,323 B2 * | 8/2018 | Ando | B60K 6/52 |
| 2014/0100071 A1 | 4/2014 | Kimes | |
| 2015/0000442 A1 | 1/2015 | Kimes et al. | |
| 2015/0014116 A1 | 1/2015 | Kimes et al. | |
| 2016/0047439 A1 | 2/2016 | Kimes et al. | |

* cited by examiner

DRIVE SYSTEMS INCLUDING TRANSMISSIONS FOR ELECTRIC AND HYBRID ELECTRIC VEHICLES

CROSS-REFERENCE TO RELATED APPLICATIONS

This application claims priority to U.S. provisional patent application Ser. No. 62/363,880 filed Jul. 19, 2016 and is a continuation-in-part of U.S. patent application Ser. No. 14/487,322 filed Sep. 16, 2014, and Ser. No. 14/037,430 filed Sep. 26, 2013, the disclosures of which are hereby incorporated in their entirety by reference herein.

TECHNICAL FIELD

This invention relates to drive systems or powertrains including transmissions for electric and hybrid electric vehicles.

OVERVIEW

A battery electric vehicle (BEV) is a type of electric vehicle (EV) that uses chemical energy stored in rechargeable battery packs. BEVs use electric motors and motor controllers instead of internal combustion engines (ICEs) for propulsion.

As described in U.S. Pat. Nos. 8,167,754; 8,226,515; 8,246,501; 8,251,850; and 8,398,514, to produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

Other U.S. patents which describe hybrid transmissions or power trains include: U.S. Pat. Nos. 5,847,469; 5,856,709; 5,934,395; 6,019,699; 6,306,057; 6,344,008; 7,201,690; 7,223,200; 7,237,634; 7,255,186; 7,393,296; 7,397,296; 7,426,971; 7,614,466; 7,621,359; 7,633,247; and 7,690,455.

A lever diagram is a schematic representation of the components of a mechanical device such as an automatic transmission. Each individual lever represents a planetary gearset wherein the three basic mechanical components of the planetary gearset are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gearset. These lever ratios, in turn, are used to vary the gear ratios of the transmission in order to achieve an appropriate ratios and ratio progression. Gear ratios may depend on gear teeth count. Mechanical couplings or interconnections between the nodes of the various planetary gearsets are illustrated by thin, horizontal lines and torque transmitting devices such as clutches and brakes are also presented. Further explanation of the format, purpose and use of lever diagrams can be found in SAE Paper 810102, "The Lever Analogy: A New Tool in Transmission Analysis" by Benford and Leising which is hereby fully incorporated by reference.

U.S. patent documents assigned to the same assignee as the present application and which are related to the present application include U.S. Pat. Nos. 8,813,929; 8,888,637; 9,109,636, 9,186,977; and 9,303,699 and U.S. published applications 2014/0100071; 2015/0000442; 2015/0014116; and 2016/0047439. The disclosures of all of the above-noted, commonly assigned patent documents are hereby incorporated in their entirety by reference herein.

Some of the above related patent documents assigned to the assignee of the present application disclose a 2-position, linear motor eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442 and 2016/0047439 disclose 3-position linear motor, magnetically-latching, 2-way CMDs.

A plug-in hybrid electric vehicle (PHEV), plug-in hybrid vehicle (PHV), or plug-in hybrid is a hybrid vehicle which utilizes rechargeable batteries, or another energy storage device, that can be restored to full charge by connecting a plug to an external electric power source (usually a normal electric wall socket). A PHEV shares the characteristics of both a conventional hybrid electric vehicle, having an electric motor and an internal combustion engine (ICE); and of an all-electric vehicle, having a plug to connect to the electrical grid. Most PHEVs on the road today are passenger cars, but there are also PHEV versions of commercial vehicles and vans, utility trucks, buses, trains, motorcycles, scooters, and military vehicles.

U.S. Pat. No. 7,942,781 discloses a high-efficiency vehicular transmission. The transmission includes a transmission housing, a set of torque delivery elements which include first and second elements supported for rotation within the housing and an electric motor for changing angular velocity of at least one of the elements in response to an electrical signal during a shift to obtain a desired transmission ratio. At least one non-friction controllable coupling assembly has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

Some attributes of a good hybrid powertrain or drive system for medium duty truck/SUV applications may include at least one of the following:

1) Tow 12,200 lbs on an 8% grade at 65 mph in all operating modes;
2) A gasoline-powered reverse mode (not just electric only);
3) 30+ mpg—recommend PHEV as opposed to an HEV (50+MPGe?);
   a. Estimate a 40 KWh pack @ 40 mile range at approx. 1000 lbs;
   b. EV Mode needs to be capable of all operating modes;
4) Most efficient electric drive cycle, especially if using a PHEV;
5) On-site power generation and PTO capability;
6) Best hybrid mode—the powersplit;
7) Both e-machines need to be capable of tractive effort;
8) Maximize power density and minimize parasitic losses—eliminating hydraulic clutches and use electro-mechanical CMD devices; these devices achieve both objectives of increased power density and better efficiency;
9) No perceived torque hole during ratio changing;
10) No added starter for ICE;
11) OD gas mode available; and
12) Non-traditional park system capable.

For purposes of this application, the term "coupling" should be interpreted to include clutches or brakes wherein one of the plates is drivably connected to a torque delivery element of a transmission and the other plates is drivably connected to another torque delivery element or is anchored and held stationary with respect to a transmission housing. The terms "coupling", "clutch" and "brake" may be used interchangeably.

SUMMARY OF EXAMPLE EMBODIMENTS

An object of at least one embodiment of the present invention is to provide highly optimized drive systems or powertrains including transmission for electric and hybrid electric vehicles.

In carrying out the above object and other objects of at least one embodiment of the present invention, a vehicle drive system including a transmission having a plurality of operating modes is provided. The system includes a gearset including first, second, third and fourth elements. The second element connects with an output shaft of the transmission. The system above includes a stationary member and control logic operative to determine a desired operating mode of the transmission and to generate corresponding command signals based on the desired operating mode. A first electric powerplant has an output shaft connecting with the first element for driving the first element in response to a first electrical power signal. A second electric powerplant has an output shaft connecting with the fourth element for driving the fourth element in response to a second electrical power signal. At least one electric powerplant controller controllably supplies the first and second electrical power signals to the first and second electrical powerplants to drive the first and fourth elements, respectively, at either a desired fixed constant speed ratio or a desired fixed constant torque ratio based on the command signals to increase overall efficiency of the first and second electric powerplants. A non-friction, controllable brake assembly has a coupling state for coupling the third element to the stationary member and an uncoupling state for uncoupling the third element from the stationary member. The brake assembly is non-hydraulically controlled to change state.

The stationary number may be a transmission housing.

The first, second, third and fourth elements may be a first sun gear, at least one ring gear, at least one carrier and a second sun gear, respectively.

The gearset may be a planetary gearset.

The planetary gearset may be a Ravigneaux, a Simpson or a modified Ravigneaux gearset.

The vehicle may be an electrical vehicle.

The first electric powerplant may be an electric motor and the second electric powerplant may be a motor-generator unit.

The transmission may provide both fixed speed ratio and fixed torque ratio modes.

One of the first and second electrical power signals may have a substantially zero value in the desired operating mode.

Further in carrying out the above object and other objects of at least one embodiment of the present invention, a vehicle drive system including a transmission having a plurality of operating modes is provided. The system includes a gearset including first, second, third and fourth elements. The second element connects with an output shaft of the transmission. The system also includes a stationary member and control logic operative to determine a desired operating mode of the transmission and to generate corresponding command signals based on the desired operation mode. A first electric powerplant has an output shaft connecting with the first element for driving the first element in response to a first electrical power signal. A second electric powerplant has an output shaft connecting with the fourth element for driving the fourth element in response to a second electrical power signal. At least one electric powerplant controller controllably supplies the first and second electrical power signals to the first and second electrical powerplants to drive the first and fourth elements, respectively, at either a desired fixed constant speed ratio or a desired fixed constant torque ratio based on the command signals, no increase overall efficiency of the first and second electric powerplants. A non-electric powerplant has an output shaft connecting with the third element for driving the third element. A non-friction, controllable brake assembly has a coupling state for coupling the third element to the stationary member and an uncoupling state for uncoupling the third element from the stationary member. The brake assembly is non-hydraulically controlled to change state. A non-friction, controllable coupling assembly has a first coupling state for coupling the non-electric powerplant to the third element, a second coupling state for coupling the non-electric powerplant to the second electric powerplant and an uncoupling state for uncoupling the non-electric powerplant from both the third element and the second electric powerplant.

The system may further include a second non-friction, controllable coupling assembly having a first coupling state for coupling the second electric powerplant to the fourth element, a second coupling state for coupling the fourth element to the stationary member and an uncoupling state for uncoupling the fourth element from both the second electric powerplant and the stationary member.

The stationary number may be a transmission housing.

The transmission may provide both fixed speed ratio and fixed torque ratio modes.

One of the first and second electrical power signals may have a substantially zero value in one of the operating modes.

The first, second, third and fourth elements may comprise a first sun gear, at least one ring gear, at least one carrier and a second sun gear, respectively.

The gearset may be a planetary gearset.

The planetary gearset may be a Ravigneaux, a Simpson or a modified Ravigneaux gearset.

The vehicle may be a hybrid electric vehicle.

The first electric powerplant may be an electric motor and the second electric powerplant may be a motor-generator unit.

Still further in carrying out the above object and other objects of at least one embodiment of the present invention, a vehicle drive system including a transmission having a plurality of operating modes is provided. The system includes a gearset including first, second, third and fourth elements. The second element connects with an output shaft of the transmission. The system also includes a stationary member and a control logic operative to determine a desired operating mode of the transmission and to generate corresponding command signals based on the desired operating mode. A first electric powerplant has an output shaft connecting with the first element for driving the first element in response to a first electrical power signal. A second electric powerplant has an output shaft connecting with the fourth element for driving the fourth element in response to a second electrical power signal. At least one electric powerplant controller controllably supplies the first and second electrical power signals to the first and second electrical powerplants to drive the first and fourth elements, respectively, based on the command signals. A non-electric powerplant having a first output shaft connects with the third element for driving the third element and a second output shaft connecting with the second electric powerplant for driving the second electric powerplant to generate electrical power. A non-friction, controllable brake assembly has a coupling state for coupling the third element to the stationary member and an uncoupling state for uncoupling the third element from the stationary member. The brake assembly is non-hydraulically controlled to change state. A non-friction, controllable coupling assembly has a first coupling state for coupling the non-electric powerplant to the third element, a second coupling state for coupling the non-electric powerplant to the second electric powerplant and an uncoupling state for uncoupling the non-electric powerplant from both the third element and the second electric powerplant. The system may further include a second non-friction, controllable coupling assembly having a first coupling state for coupling the second electric powerplant to the fourth element, a second coupling state for coupling the fourth element to the stationary member and an uncoupling state for uncoupling the fourth element from both the second electric powerplant and the stationary member.

The stationary number may be a transmission housing.

The first, second, third and fourth elements may comprise a first sun gear, at least one ring gear, at least one carrier and a second sun gear, respectively.

The gearset may be a planetary gearset.

The planetary gearset may be a Ravigneaux, a Simpson or a modified Ravigneaux gearset.

The vehicle may be a hybrid electric vehicle.

The first electric powerplant may be an electric motor and the second electric powerplant may be a motor-generator unit.

The non-electric powerplant may be an engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1, 2, 5 and 8-17, there are illustrated schematic lever diagrams of a vehicle drive system 10 including an electrically variable transmission 18 employed in a hybrid powertrain or drive system constructed in accordance with at least one embodiment of the present invention.

Figure 1:
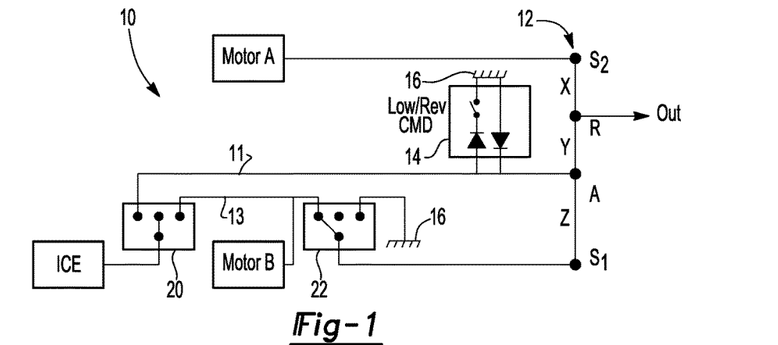
FIGS. 1, 2, 5 and 8-17 are schematic lever diagrams of a vehicle drive system showing an electrically variable transmission employed in a hybrid vehicle powertrain wherein different operating modes are illustrated.

The hybrid powertrain includes multiple power sources or powerplants including an internal combustion engine (ICE) having a first rotary output shaft 11 and a second rotary output shaft 13 that are parallel to each other, an electric motor (Motor A), and an electric motor/generator (Motor B), all connecting with an "electrically variable transmission" (EVT). As is known by those skilled in the art, an "electrically variable transmission" constitutes a transmission planetary gear train or gear set 12 operatively connected with each of the engine, a first motor/generator and a second motor/generator. Channeling respective torques of the engine and the two motor/generators to different members of the planetary gear train or gearset 12 permits one of the power sources to either assist or balance the operation of any of the other two. Thus, the combination of one engine and two motor/generators operatively connected to the EVT allows speeds and torques of the engine and motor/generators to be controlled and selected independently in order to power a subject vehicle more efficiently.

The gearset of FIG. 1 has four elements—a first sun gear (S2), at least one ring gear (R), at least one carrier (A) and a second sun gear (S1). X, Y, and Z are numbers (N) based on gear tooth counts. In the case of the gearset S2, R, A and S1 being a Ravigneaux gearset:

$$X = N_{Ring} - N_{sun2}$$

$$Y = N_{sun2}$$

$$Z = N_{Ring} * (N_{sun2}/N_{sun1})$$

The hybrid powertrain of FIG. 1 has a plurality of modes as indicated by the following outline wherein each mode has associated therewith a particular drawing figure as follows:

Modes
1. EV
   a. Speed Ratio—FIG. 2
   b. Torque Ratio—FIG. 5
2. Hybrid Powersplit—FIG. 8
3. Gas—OD—FIG. 9
4. Reverse
   a. Electric—FIG. 10
   b. Serial Hybrid—FIG. 11
5. Power Generation—FIG. 12
6. Park—FIG. 13
7. Serial Hybrid
   a. $1^{st}$ forward—FIG. 14
   b. $2^{nd}$ Forward—FIG. 15
8. PTO—FIG. 16
9. M&M (Max Movement)—FIG. 17 the hybrid powertrain of FIG. 1 also includes 2-position linear motor, electrically controllable, CMD 14 (i.e. Low/Rev CMD) or one-way clutch having a first operative state coupled to a stationary member 16 of the transmission 18 such as, for example, a housing of the transmission 18 (as indicated by ground) and a second operative powertrain for use in Low/Rev modes.

The hybrid powertrain of FIG. 1 above includes a pair of 3-position linear motors, respectively, latching, 2-way CMDs, one of which is connected among the ICE, node A and Motor B and the other of which is connected among one of the output shafts of the ICE, Motor B, the transmission housing 16 and node S1.

Figure 3:
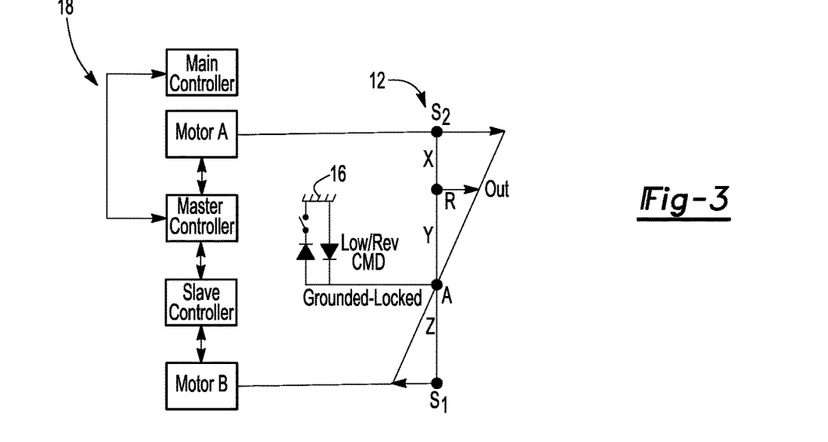
FIGS. 3 and 6 are schematic lever diagrams of an electrically variable transmission including various controllers employed in an electric vehicle powertrain.

Referring to FIG. 3, there is illustrated a schematic lever diagram of an electrically variable transmission 18 employed in an electric vehicle (EV) powertrain and can be viewed as a subset or subsystem of the hybrid powertrain of FIG. 1. A Simpson or Ravigneaux gearset may be used and node A is grounded/locked. The mode illustrated is a fixed speed ratio mode (i.e. the lever pivots about node A).

Torque output (i.e. $T_{out}$) is equal to $T_A((X+Y)/Y)+T_B(Z/Y)$ wherein $T_A$ equals motor A torque output and $T_B$ equals motor B torque output.

The speed ratio between Motor A and Motor B is a fixed constant in this mode. However, the torque values for either motor are variable and independent of each other. So by adjusting the input torques of each motor with respect to a given vehicle speed and torque demand, torque values for Motor A and Motor B can be chosen via control logic to optimize the overall efficiency of both motors. This mode can use Motor A, Motor B, or Motors A+B.

Figure 4A:
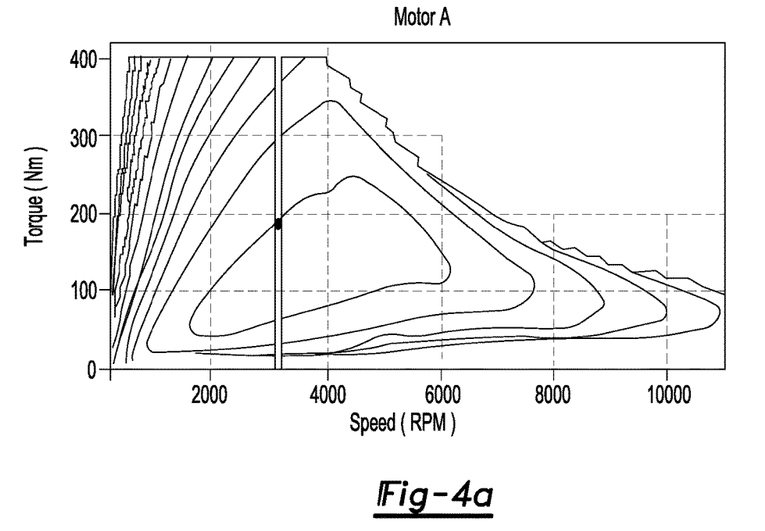
FIGS. 4a and 4b are torque versus speed graphs of motors A and B, respectively, particularly illustrating motor efficiency and both having constant, vertical speed lines.
Figure 4B:
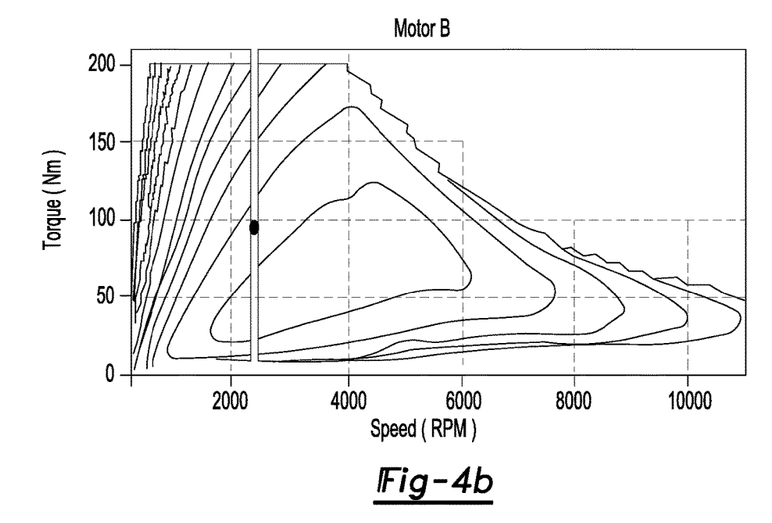

As an example of the EV-fixed speed ratio mode, (referring to the illustrated graphs of FIGS. 4a and 4b) is given as:
Vehicle tire size: 245/70R17
Final Drive: 3.55
Vehicle Speed: 30 MPH
Output shaft Speed: 1173 RPM
Motor A Speed: 3214 RPM
Motor B Speed: 2616 RPM
From Throttle Position . . .
Commanded Output torque: 800 NM In this mode the motor output speeds are fixed. The torques are variable and must adhere to this formula where X, Y, and Z are the lengths on the 4 node lever.

$$T_{out}=T_A((X+Y)/Y)+T_B(Z/Y)$$

Using the 6R80 (Ravigneaux) gearset yields . . .

$$T_{out}=T_A(2.74)+T_B(2.23)$$

Software or control logic picks the torque values of Motor A and Motor B along the constant speed lines of FIGS. 4a and 4b that maximizes overall motor efficiency.

Figure 2:
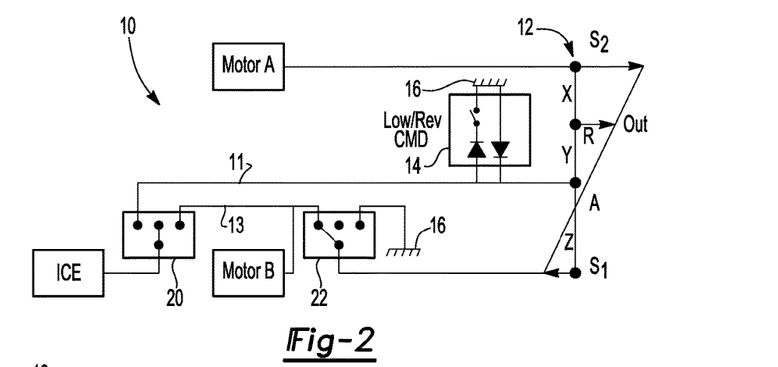

Referring now to FIG. 2, the powertrain illustrated therein has the same EV mode (i.e. fixed speed ratio) as the 2-motor EV of FIG. 3.

Motor A, Motor B, or Motors A+B can be active via control logic to optimize efficiency. The ICE is OFF and disconnected via its 2-way ICE CMD. The B-Motor is clutched to S1. As illustrated by the highlighted horizontal speed graph, the highway range of the vehicle is 0-50 mph.

Figure 6:
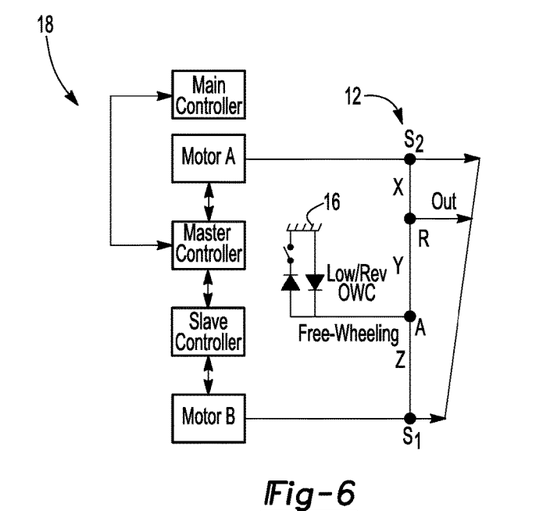

Referring now to FIG. 6, there is illustrated a schematic lever diagram of the electrically variable transmission 18 of FIG. 3 wherein the mode illustrated is a fixed torque ratio mode satisfying the following equations:

$$T_A+T_B=T_{out}$$

$$\Sigma M_{S1}=0=T_A(X+Y+Z)-T_{out}(Y+Z)$$

$$\Sigma M_{S2}=0=T_B(X+Y+Z)-T_{out}(X)$$

wherein M is moment and $\Sigma M$ is the summation of the various movements about a node such as S1 or S2.

The torque ratio between Motor A and Motor B is a fixed constant in this mode. However, the speed values for either motor are variable and dependent on each other. So by adjusting the input speeds of each motor with respect to a given vehicle speed and torque demand, speed values for Motor A and Motor B can be chosen to optimize the overall efficiency of both motors. This mode typically requires both motors to be active via the control logic. As with the powertrain of FIG. 3, a Simpson or Ravigneaux gearset may be used.

Figure 7A:
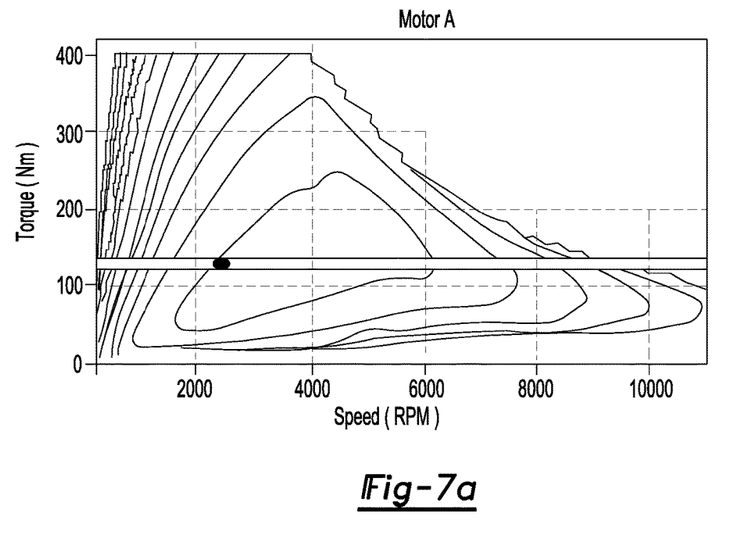
FIGS. 7a and 7b are similar to the screenshots of FIGS. 4a and 4b, and both FIGS. 7a and 7b having constant, horizontal torque lines.
Figure 7B:
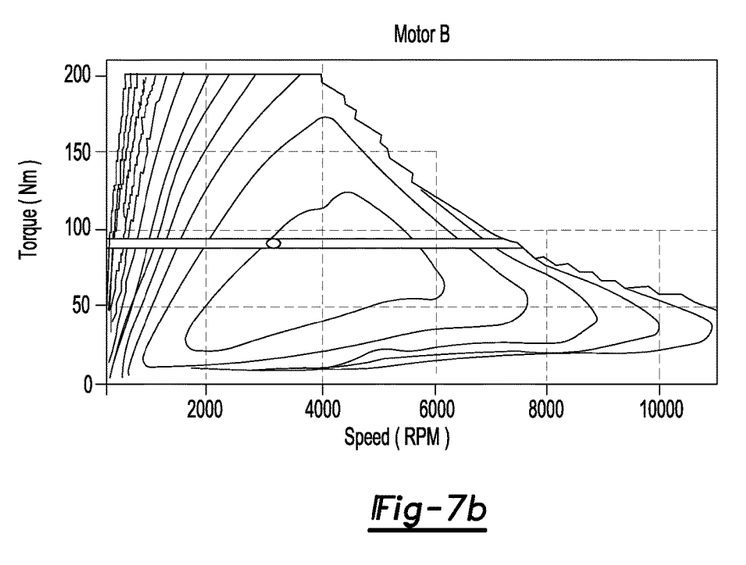

The following is an example of the EV-torque ratio mode with reference to the screenshots and illustrated graphs of FIGS. 7a and 7b with:
Vehicle tire size: 245/70R17
Final Drive: 3.55
Vehicle Speed: 60 MPH
Output shaft Torque: 200 Nm
Motor A Torque: 130 Nm
Motor B Torque: 70 Nm
From throttle Position . . .
Commanded Output Torque: 200 NM In this mode the torques are fixed. The speeds are variable and must adhere to this formula where X, Y, and Z are the lengths on the 4 node lever . . .

$$T_A+T_B=T_{out} \tag{1}$$

$$\Sigma M_{S1}=0-T_A(X+Y+Z)-T_{out}(X) \tag{2}$$

$$\Sigma M_{S2}=0=T_B(X+Y+Z)-T_{out}(X) \tag{3}$$

Software or control logic picks the speed values of Motor A and Motor B along the constant torque line that maximizes overall efficiency.

Figure 5:
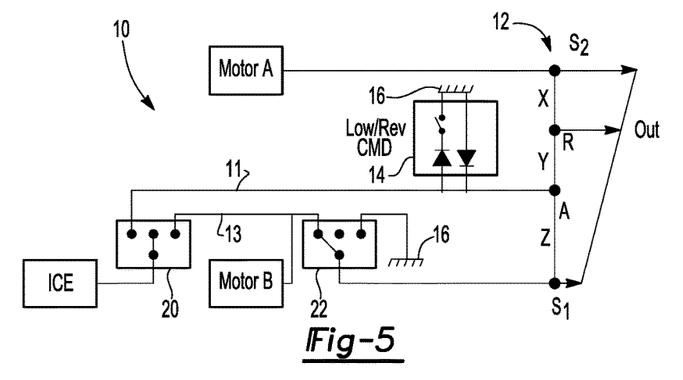

Referring now to FIG. 5, the powertrain illustrated therein has the same EV mode (fixed torque ratio) as the 2-motor EV of FIG. 6. Motors A+B are active via the control logic. The ICE is OFF and disconnected via its 2-way CMD. The B-Motor is clutched to S1 via its 2-way Motor B CMD. The highway range is 50-100 MPH.

Figure 8:
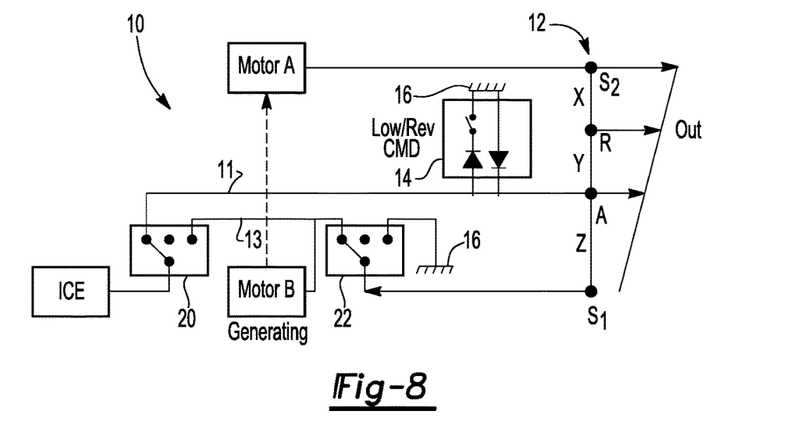

Referring now to FIG. 8, there is illustrated a schematic lever diagram of the electrically variable transmission 18 of FIGS. 3 and 6 wherein the mode illustrated is a hybrid power-split mode. The highway range is 20-80 MPH. This mode uses a Ravigneaux gearset. The ICE is clutched to the carrier (i.e. node A) via its 2-way ICE CMD 20 and B-Motor is clutched to S1 via its 2-way Motor B CMD 22.

Figure 9:
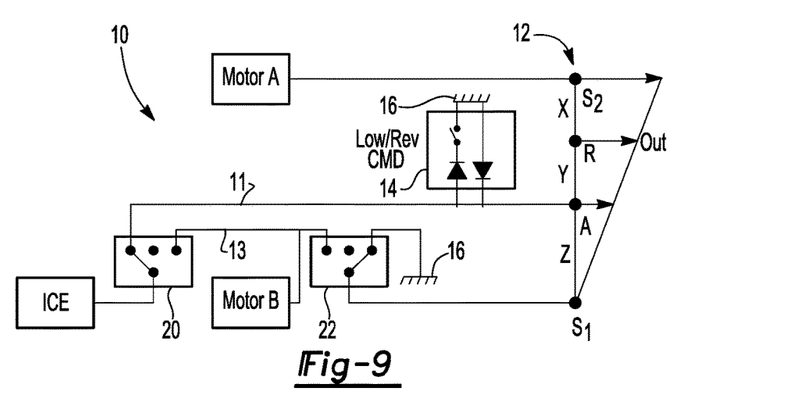

Referring now to FIG. 9, there is illustrated a schematic lever diagram of the electrically variable transmission 18 of FIGS. 3, 6, and 8 wherein the mode illustrated is a Gas-OD mode. The highway range is 70-100 MPH. This mode typically exits all electric modes and enters into a highway mode (Gas OD). Motor A can boost if necessary. Motor B is disconnected and grounded via its 2-way Motor B CMD 22. The ICE is attached to the carrier (i.e. node A) via one of its output shafts 11, 13 via its 2-way ICE CMD 20 and S1 is grounded.

Figure 10:
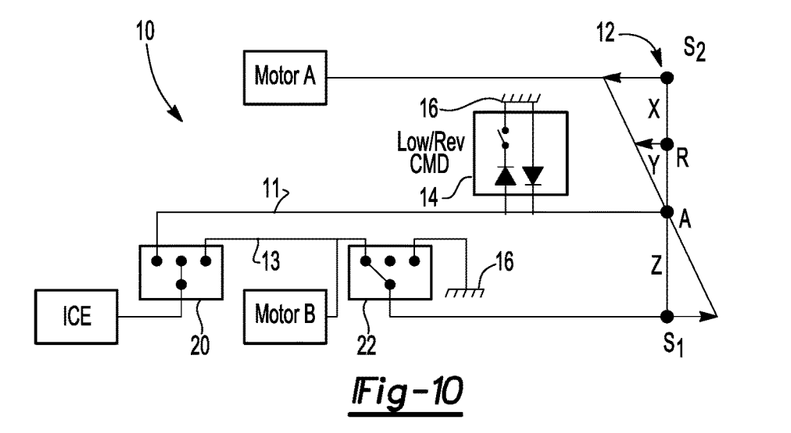

Referring now to FIG. 10, there is illustrated a schematic lever diagram of the electrically variable transmission 18 of FIGS. 3, 6, 8 and 9 wherein the mode illustrated is a reverse-electric mode. The highway range is <0 MPH. Node A is grounded via the 1-way CMD 14. This is the same mode as the fixed speed ratio mode of the 2-motor EV. Motor A, Motor B, or Motors A+B can be active as controlled by control logic to optimize efficiency spinning in reverse. The ICE is OFF and disconnected via its 2-way ICE CMD 20. The B-Motor is clutched to S1, (via its 2-way Motor B CMD 20). The A motor is spinning in reverse and the vehicle is moving in reverse.

Figure 11:
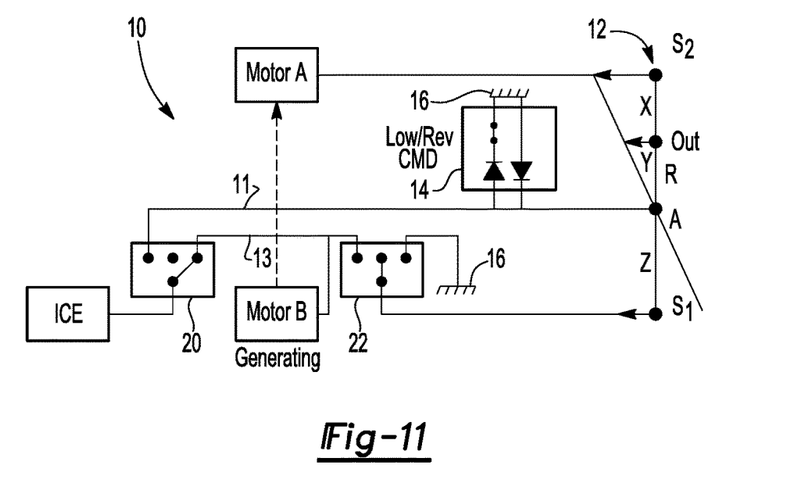

Referring now to FIG. 11, there is illustrated a schematic lever diagram of the electrically variable transmission 18 of FIGS. 3, 6, 8, 9 and 10 wherein the mode illustrated is a reverse-serial hybrid mode. Node A is grounded via the one-way CMD 14. In this mode, gasoline is the source of power for reverse. The ICE is attached to Motor B via one of the engine's output shafts 11, 13 and its 2-way ICE 20 CMD and ICE and Motor B are isolated from the transmission/wheels via the 2-way CMD of Motor B. Mechanical power from the ICE is converted to electrical power via the motor-Generator Unit (Motor B) and is dumped into Motor A which is rotating again in the reverse direction. Reverse ratio is the same as forward ratio.

Figure 12:
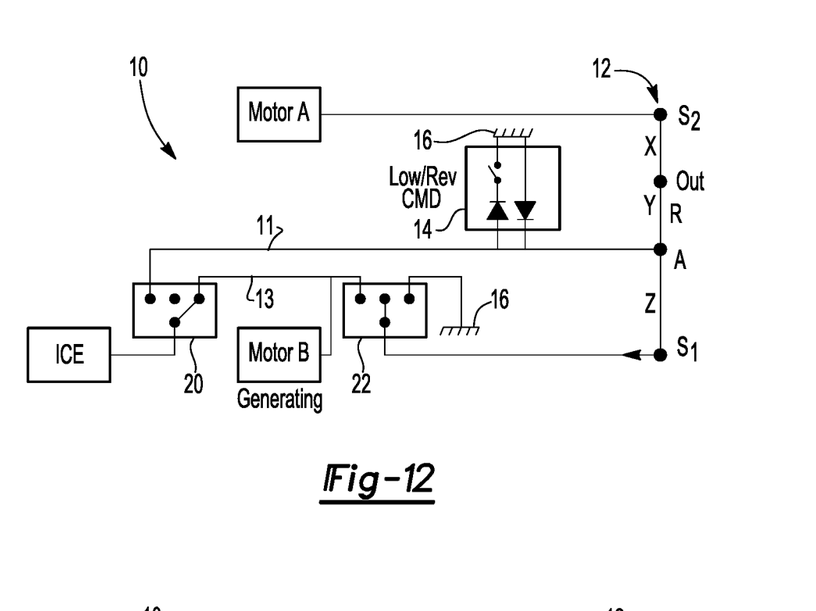

Referring now to FIG. 12, there is illustrated a schematic lever diagram of the electrically variable transmission 18 of FIGS. 3, 6, 8, 9, and 11 wherein the mode illustrated is a power generation mode. In this mode, the ICE spins Motor B via one of its output shafts 11, 13 and the 2-way ICE CMD 20 and this pair is disconnected from the powertrain via the 2-way Motor B CMD 22. The vehicle is not moving (i.e. 0 MPH) and it generates electric power for onsite use.

Figure 13:
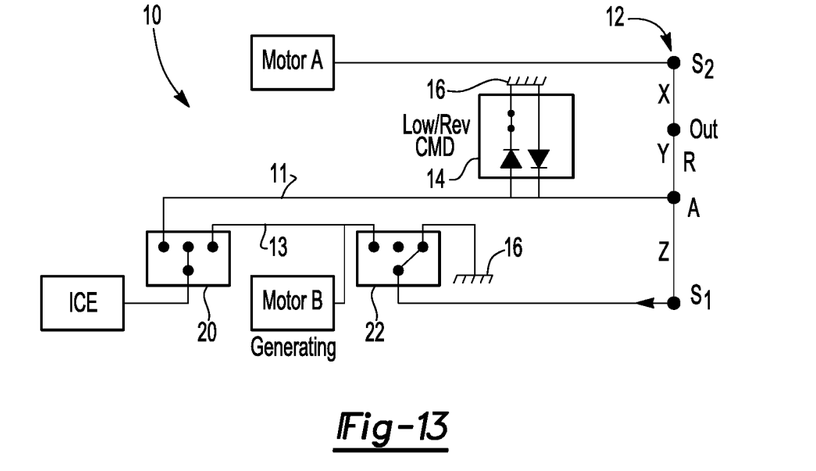

Referring now to FIG. 13, there is illustrated a schematic lever diagram of the electrically variable transmission 18 of FIGS. 3, 6, 8, 9, 10, 11 and 12 wherein the mode illustrated is a park mode. In this mode, S1 is grounded via the 2-way Motor B CMD 22 and node A is grounded via the 1-way CMD 14. Thus the entire lever is tied to ground 16. This performs the function of Park (i.e. 0 MPH).

Figure 14:
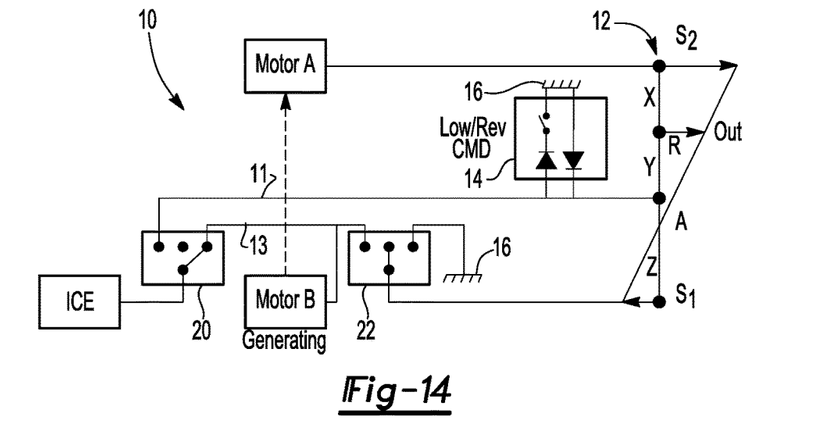

Referring now to FIG. 14, there is illustrated a schematic lever diagram of the electrically variable transmission 18 of FIGS. 3, 6, 8, 9, 10, 11, 12 and 13 wherein the mode illustrated is a serial hybrid—$1^{st}$ forward mode. The highway range is 0-40 MPH. This mode allows the ICE to idle at a stop to run HVAC, PTO operation, and have the ability to launch the vehicle using just Motor A with generator—Motor Unit B generating electrical power for Motor A via one of the output shafts 11, 13 of the ICE and its 2-way ICE CMD 20.

Figure 15:
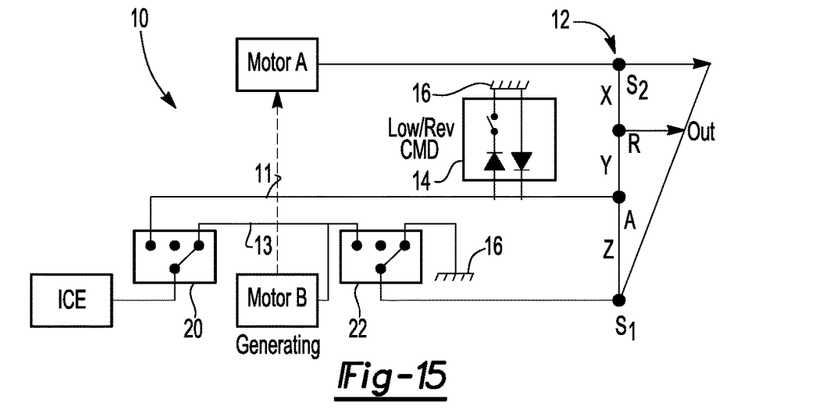

Referring now to FIG. 15, there is illustrated a schematic lever diagram of the electrically variable transmission 18 of FIGS. 3, 6, 8, 9, 10, 11, 12, 13 and 14 wherein the mode illustrated is a serial hybrid—$2^{nd}$ forward mode. The highway range is 40-80 MPH. This mode allows the vehicle to run efficiently at higher vehicle speeds just using Motor A with Motor B generating electrical power for Motor A via the ICE and one of its output shafts 11, 13 and via the 2-way ICE CMD 20.

Figure 16:
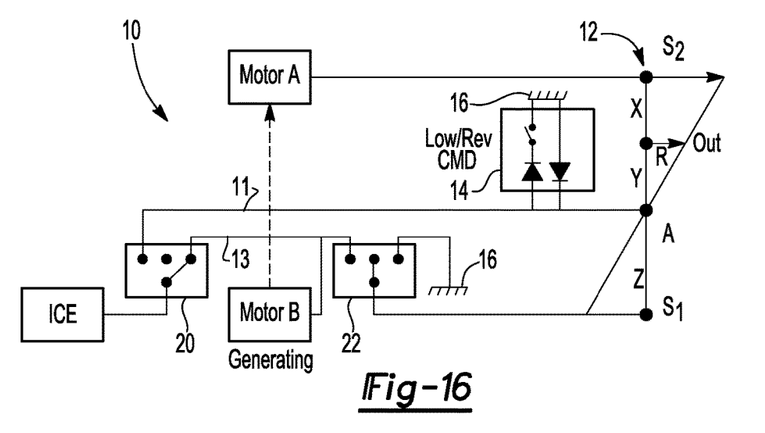

Referring now to FIG. 16, there is illustrated a schematic lever diagram of the electrically variable transmission 18 of FIGS. 3, 6, 8, 9, 10, 11, 12, 13, 14 and 15 with a power-take-off (i.e. PTO) wherein the mode illustrated is a PTO mode. The highway range is 0-40 MPH. This mode allows the ICE to idle at a stop to run HVAC, PTO operation (via one of its output shafts 11, 13 via its 2-way ICE CMD 20), and have the ability to launch the vehicle using only Motor A with Motor B generating electrical power for Motor A.

Figure 17:
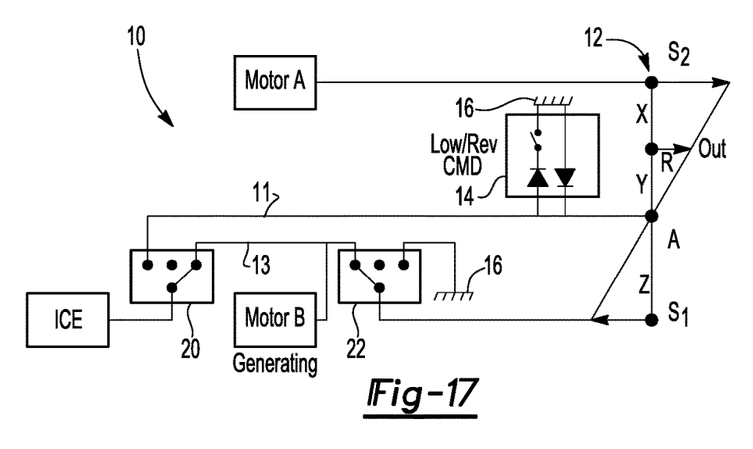

Referring now to FIG. 17, there is illustrated a schematic lever diagram of the electrically variable transmission 18 of FIGS. 3, 6, 8, 9, 10, 11, 12, 13, 14, 15 and 16 (without the PTO) wherein the mode illustrated is a M+M (max movement) mode. All three power plants (Motor A, Motor B, ICE) are used for tractive effort and the torques of all three power plants are multiplied through the gearset. The direction of the ICE is reversed through gearing on the parallel shaft 13 going to Motor B (i.e. Motor B is generating torque, not electrical power in this mode). The highway range is 0-60 MPH.

It is to be understood that the above noted hybrid powertrain can be utilized is a variety of configurations including, but not limited to, a front wheel drive configuration.

Referring to FIGS. 3, 4a, 4b, 6, 7a and 7b, each embodiment of a drive system or powertrain constructed in accordance with the invention may utilize a main controller or TECU (transmission electronic control unit) and one or more electric motor controllers for Motors A and Motor B as shown by the master and slave controllers in FIGS. 3 and 6. The slave controller is controlled by the master controller. However, it is to be understood as noted above that each embodiment typically has such controllers which are omitted from the other drawing figures for the sake of simplicity.

In general, the TECU provides and regulates the power to drive Motor A and Motor B motors through the master and slave controllers. Each motor controller typically has a microcontroller (i.e. MCU) including circuitry. The master motor controller typically receives command signals from the remote electronic control unit (TECU) over or through a vehicle-based bus (not shown).

Preferably, the control logic is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like.

The TECU and the master controller are connected via a vehicle bus such as a local interconnect network (LIN or CAN) line or bus capable of two-way communications. LIN is one of many possible in-vehicle local area network (LAN) communications protocols. A power line and a ground line may be provided between the TECU and the master controller. Each motor controller typically includes a transceiver interface within the MCU, a microprocessor and its control logic within the MCU, and a motor drive or driver, and an electrical power source. Each motor controller may be integrated or physically coupled with its motor in its clutch housing, while the TECU is provided some distance away from the clutch housings.

The MCU of the motor controller typically includes a memory and may be configured as a conventional microcomputer including a CPU, a ROM, a RAM and the like or as a hardwired logic circuit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle drive system including a transmission having a plurality of operating modes, the system comprising:
    a gearset including first, second, third and fourth elements, the second element connecting with an output shaft of the transmission;
    a stationary member;
    control logic operative to determine a desired operating mode of the transmission and to generate corresponding command signals based on the desired operating mode;
    a first electric powerplant having an output shaft connecting with the first element for driving the first element in response to a first electrical power signal;
    a second electric powerplant having an output shaft connecting with the fourth element for driving the fourth element in response to a second electrical power signal;
    at least one electric powerplant controller to controllably supply the first and second electrical power signals to the first and second electrical powerplants to drive the first and fourth elements, respectively, at either a desired fixed constant speed ratio or a desired fixed constant torque ratio based on the command signals to increase overall efficiency of the first and second electrical powerplants; and
    a non-friction, controllable brake assembly having a coupling state for coupling the third element to the stationary member and an uncoupling state for uncoupling the third element from the stationary member, the brake assembly being non-hydraulically controlled to change state.

2. The system as claimed in claim 1, wherein the stationary member comprises a transmission housing.

3. The system as claimed in claim 1, wherein the first, second, third and fourth elements comprising a first sun gear, at least one ring gear, at least one carrier and a second sun gear, respectively.

4. The system as claimed in claim 1, wherein the gearset is a planetary gearset.

5. The system as claimed in claim 4, wherein the planetary gearset is a Ravigneaux, a Simpson or a modified Ravigneaux gearset.

6. The system as claimed in claim 1, wherein the vehicle is an electric vehicle.

7. The system as claimed in claim 1, wherein the first electric powerplant is an electric motor and the second electric powerplant is a motor-generator unit.

8. The system as claimed in claim 1, wherein the transmission provides both fixed speed ratio and fixed torque ratio modes.

9. The system as claimed in claim 1, wherein one of the first and second electrical power signals has a substantially zero value in the desired operating mode.

10. A vehicle drive system including a transmission having a plurality of operating modes, the system comprising:
    a gearset including first, second, third and fourth elements, the second element connecting with an output shaft of the transmission;
    a stationary member;
    control logic operative to determine a desired operating mode of the transmission and to generate corresponding command signals based on the desired operation mode;
    a first electric powerplant having an output shaft connecting with the first element for driving the first element in response to a first electrical power signal;
    a second electric powerplant having an output shaft connecting with the fourth element for driving the fourth element in response to a second electrical power signal;
    at least one electric powerplant controller to controllably supply the first and second electrical power signals to the first and second electrical powerplants to drive the first and fourth elements, respectively, at either a desired fixed constant speed ratio or a desired fixed constant torque ratio based on the command signals to increase overall efficiency of the first and second electrical powerplants;
    a non-electric powerplant having an output shaft connecting with the third element for driving the third element;
    a non-friction, controllable brake assembly having a coupling state for coupling the third element to the stationary member and an uncoupling state for uncoupling the third element from the stationary member, the brake assembly being non-hydraulically controlled to change state; and
    a non-friction, controllable coupling assembly having a first coupling state for coupling the non-electric powerplant to the third element, a second coupling state for coupling the non-electric power plant to the second electric powerplant and an uncoupling state for uncoupling the non-electric powerplant from both the third element and the second electric powerplant.

11. The system as described in claim 10, further comprising a second non-friction, controllable coupling assembly having a first coupling state for coupling the second electric powerplant to the fourth element, a second coupling state for coupling the fourth element to the stationary member and an uncoupling state for uncoupling the fourth element from both the second electric powerplant and the stationary member.

12. The system as claimed in claim 10, wherein the stationary member comprises a transmission housing.

13. The system as claimed in claim 10, wherein the transmission provides both fixed speed ratio and fixed torque ratio modes.

14. The system as claimed in claim 10, wherein one of the first and second electrical power signals has a substantially zero value in one of the operating modes.

15. The system as claimed in claim 10, claim the first, second, third and fourth elements comprising a first sun gear, at least one ring gear, at least one carrier and a second sun gear, respectively.

16. The system as claimed in claim 10, wherein the gearset is a planetary gearset.

17. The system as claimed in claim 16, wherein the planetary gearset is a Ravigneaux, a Simpson or a modified Ravigneaux gearset.

18. The system as claimed in claim 10, wherein the vehicle is a hybrid electric vehicle.

19. The system as claimed in claim 10, wherein the first electric powerplant is an electric motor and the second electric powerplant is a motor-generator unit.

20. A vehicle drive system including a transmission having a plurality of operating modes, the system comprising:
- a gearset including first, second, third and fourth elements, the second element connecting with an output shaft of the transmission;
- a stationary member;
- a control logic operative to determine a desired operating mode of the transmission and to generate corresponding command signals based on the desired operating mode;
- a first electric powerplant having an output shaft connecting with the first element for driving the first element in response to a first electrical power signal;
- a second electric powerplant having an output shaft connecting with the fourth element for driving the fourth element in response to a second electrical power signal;
- at least one electric powerplant controller to controllably supply the first and second electrical power signals to the first and second electrical powerplants to drive the first and fourth elements, respectively, based on the command signals;
- a non-electric powerplant having a first output shaft connecting with the third element for driving the third element and a second output shaft connecting with the second electric powerplant for driving the second electric powerplant to generate electrical power;
- a non-friction, controllable brake assembly having a coupling state for coupling the third element to the stationary member and an uncoupling state for uncoupling the third element from the stationary member, the brake assembly being non-hydraulically controlled to change state; and
- a non-friction, controllable coupling assembly having a first coupling state for coupling the non-electric powerplant to the third element, a second coupling state for coupling the non-electric power plant to the second electric powerplant and an uncoupling state for uncoupling the non-electric powerplant from both the third element and the second electric powerplant.

21. The system as described in claim 20, further comprising a second non-friction, controllable coupling assembly having a first coupling state for coupling the second electric powerplant to the fourth element, a second coupling state for coupling the fourth element to the stationary member and an uncoupling state for uncoupling the fourth element from both the second electric powerplant and the stationary member.

22. The system as claimed in claim 20, wherein the stationary member comprises a transmission housing.

23. The system as claimed in claim 20, wherein the first, second, third and fourth elements comprising a first sun gear, at least one ring gear, at least one carrier and a second sun gear, respectively.

24. The system as claimed in claim 20, wherein the gearset is a planetary gearset.

25. The system as claimed in claim 24, wherein the planetary gearset is a Ravigneaux, a Simpson or a modified Ravigneaux gearset.

26. The system as claimed in claim 20, wherein the vehicle is a hybrid electric vehicle.

27. The system as claimed in claim 20, wherein the first electric powerplant is an electric motor and the second electric powerplant is a motor-generator unit.

28. The system as claimed in claim 20, wherein the non-electric powerplant is an engine.

\* \* \* \* \*